March 25, 1969 J. J. SCHIRA ET AL 3,435,424

SYNCHRONIZING SYSTEM

Filed March 3, 1967 Sheet 1 of 3

INVENTORS.

JOHN J. SCHIRA
WILLIAM R. SADLER
THOMAS J. DRAGON

BY Stephen P. Fox

AGENT

FIG. 2
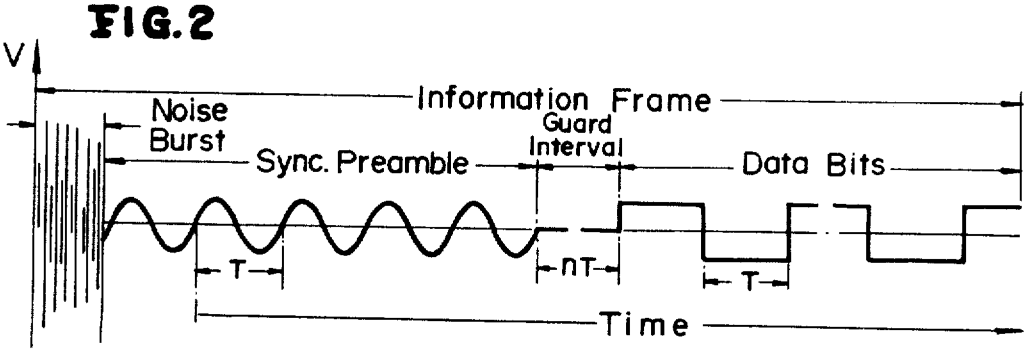
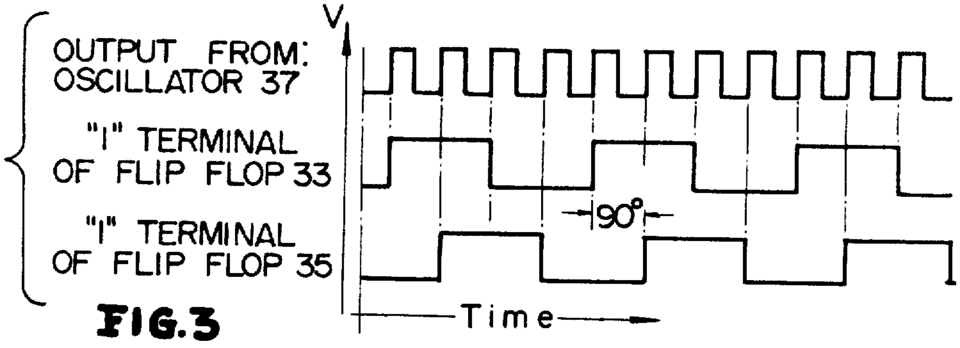
FIG. 3
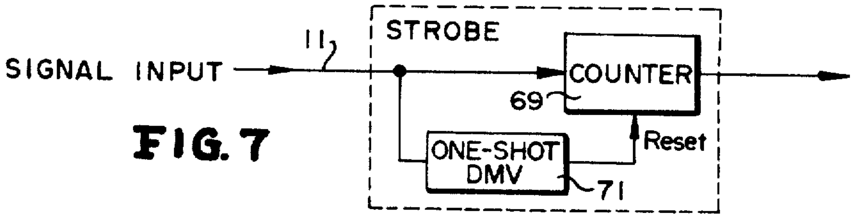
FIG. 7
| θ | Output From: Integrator 15 | Integrator 27 | Flip-flop 47 | Flip-flop 49 | OR gate 55 | AND gate selected |
|---|---|---|---|---|---|---|
| 0° to 60° 330° to 360° | >V⁺ | — | 1 | 1 | (REF.) $_I$ | 39 |
| 60° to 150° | — | >V⁺ | 0 | 1 | (REF. +90°) $_I$ | 41 |
| 150° to 240° | <V⁻ | — | 0 | 0 | REF. | 43 |
| 240° to 330° | — | <V⁻ | 1 | 0 | REF. +90° | 45 |
FIG. 8
INVENTORS
JOHN J. SCHIRA
WILLIAM R. SADLER
THOMAS J. DRAGON
BY
Stephen P. Fox
AGENT

INVENTORS
JOHN J. SCHIRA
WILLIAM R. SADLER
THOMAS J. DRAGON

BY Stephen P. Fox
AGENT

United States Patent Office 3,435,424

Patented Mar. 25, 1969

3,435,424

SYNCHRONIZING SYSTEM

John J. Schira, Westland, William R. Sadler, Detroit, and Thomas J. Dragon, Southfield, Mich., assignors to Burroughs Corporation, Detroit, Mich., a corporation of Michigan Filed Mar. 3, 1967, Ser. No. 620,492

Int. Cl. H03k 5/20

U.S. Cl. 340—172.5 15 Claims

ABSTRACT OF THE DISCLOSURE

A data bit timing system for synchronizing local clock pulses with the data bits of a digital information signal received at random phase and under adverse environmental conditions. The phase of a periodically received synchronization preamble signal is detected relative to several local reference signals by synchronous detectors, the outputs of which are integrated to produce an analog signal. The analog signal is digitalized by threshold circuits and logic gates to quantize the phase of the preamble signal into one of four 90° phase intervals. The digitalized outputs drive flip-flop and logic gate circuitry which selects and holds in memory one of the local reference signals as a clock signal for sampling subsequently received data bits near their centers. The particular reference signal selected as a clock depends on the detected phase of the received preamble signal. Strobe circuitry triggers the clock selection logic into a new memory-hold configuration each time a preamble signal is received, so that continuous optimum synchronization is maintained between the clock signal and the data bits of a message.

This invention relates generally to a synchronizing system for a digital communications processor, and more particularly, to a system for determining the phase relationship between local clock signals and received data information signals.

In order to interpret a received signal sequence properly, a digital receiver must be clocked with the proper timing pulses. In a sequence of serially transmitted binary symbols, each symbol is generally designated a data bit and the local synchronized clock pulses are usually called bit timing. Each data bit in the sequence should be sampled at a time when its value has become fully established and is not in a condition of transition. the relative phase of the received data bits and the bit timing should be determined and adjusted so that the clock pulses have a proper timing relationship with respect to the data bits. The optimum phase relationship for proper synchronization is achieved when a clock pulse occurs near the center of a received data bit.

The phase adjustment between clock pulses and data bits for proper synchronization may be achieved in several ways. One method is to determine if the phase of the data bit signal leads or lags the clock pulse signal and then appropriately to shift or delay the data signal so that it is in synchronism with the clock signal. A second method is to shift the clock signal with respect to the data signal to produce synchronization. The present invention utilizes a different and novel method in which a plurality of phase separated reference signals are provided, and a particular one thereof is selected as a clock signal for synchronous reception of a group of data bits comprising a message. The particular reference signal selected depends on the phase of the received data bit message.

Once synchronization has been established, it must be adequately maintained. Generally, transmitting and receiving equipment is not sufficiently stable to maintain a specified phase relationship over a long period of time. Also, in the case where data information is transmitted by radio waves, adverse environmental conditions may cause undesirable phase changes. Thus, over an extended period of time, the information received at the receiving terminal may be either delayed or advanced with respect to the clock timing signals. The resulting loss of synchronism may cause unfaithful reproduction of the information signals at the receiving station. This situation may be remedied by dividing the information signal into a sequence of "frames," each of which includes a synchronizing preamble signal followed by a series of message data bits. Each synchronizing preamble is preferably of relatively short duration in comparison with the succeeding data signal, and serves to preset the bit timing at the receiving terminal in synchronism with the data bits to follow. Therefore, synchronization is established and held for each frame interval and the effects of equipment instability and atmospheric conditions are substantially eliminated.

Another factor which must be considered in the processing of digital information signals is the occurrence of interfering noise. Improper synchronization and the resulting false interpretation of received data bits may be caused by the effects of environmental interference such as noise spikes and noise bursts. The problem of eliminating noise is especially acute when the magnitude of a useful signal is the same as, or less than, that of noise interference.

Accordingly, it is the principal object of the present invention to provide an improved system for synchronizing bit timing signals with information signals received at random phase.

It is another object of the present invention to provide an improved system for deriving proper bit timing from a synchronization preamble signal which precedes the data bits of a message.

It is another object of the present invention to correlate the phases of a sequentially received digital information signal and locally generated reference signals and to select a local clock which provides for optimum sampling of the received signal at the approximate center of the message data bits.

It is another object of the invention to improve a system for maintaining continuous synchronization between clock pulses and data bits by establishing synchronization at the beginning of each of a series of successive information frames.

It is a further object of the invention to provide a system which responds only to coherent digital information signals and rejects noise and other noncoherent signals.

In accomplishing the foregoing objectives and other desirable purposes, applicants have invented a method and apparatus for establishing optimum bit timing by comparing a received signal with a plurality of local reference signals and on the basis of this comparison, selecting one of the reference signals as a clock signal. The method of applicants' system comprises the steps of phase detecting the random phase repetitive waveform preamble of an information signal with respect to local reference signals, integrating the detected signals over a predetermined time period, threshold detecting the integrated analog signals to produce digitalized outputs for quantizing the phase difference between the preamble and reference signals into one of four 90° phase intervals, and logically interpreting the digitalized outputs to select one of four 90° phase related modes of the reference signals for use as a local clock to sample the data bits of the information signal near their centers.

The phase detector circuitry of the system includes first and second synchronous detectors controlled respectively by locally generated reference signals which are shifted 90° from one another and have the same frequency as a synchronization preamble signal preceding the data bit message. Each of the synchronous detectors has an input which is connected to the incoming random phase information signal. The outputs of the first and second synchronous detectors are connected respectively to first and second integrators, each of which drives maximum and minimum threshold circuits. The outputs of the threshold circuits, along with the aforementioned local reference signals, comprise the inputs to the clock selection circuitry, which is a combination of logic gates and flip-flops. At the beginning of each information frame, the clock selection logic is triggered into a memory-hold configuration by strobe circuitry.

In operation, the random phase input signal is fullwave detected with respect to the local reference signals by the two synchronous detectors, and the resulting output therefrom is integrated over a predetermined number of cycles. The resulting integrator outputs are DC analog voltage levels having magnitudes dependent on the synchronous detector output waveforms, which in turn are dependent on the phase differences between the input signal and the reference signals. The maximum and minimum threshold circuits are set so that their outputs in combination represent phase differences in 90° intervals. On the basis of the digital outputs from the four threshold circuits, the phase decision logic selects one of four possible synchronous timing clocks corresponding to shortened forms of the two aforementioned reference signals and their respective inverted counterparts. The selected clock signal is held in memory for the duration of an information frame.

A main feature of the present invention is the novel utilization of synchronous detectors and integrators in the system configuration. The synchronous detectors operate at the same frequency as the synchronization preamble signal and thereby serve to separate the desired signal from unwanted interfering signals of different frequencies. The synchronous detector outputs, along with superimposed random interfering noise signals, are applied to the integrator circuits, which average their input signals over a predetermined period of time corresponding to the duration of the synchronization preamble. During the averaging period, the desired synchronization information is represented by a gradually changing DC voltage level, whereas random noise interference adds and subtracts from the DC level and tends to approach a mean value of zero. Thus, the system operates at a high signal to noise ratio. Additional means is provided for monitoring the information signal input and rejecting noise bursts which might otherwise cause false operation of the system.

Other objects and features of the invention will be specifically pointed out or will become more apparent when referring to the following description taken in conjunction with the accompanying drawings in which:

FIG. 2 is an illustration of one type of input signal utilizable with the system of FIG. 1.

Figure 1:
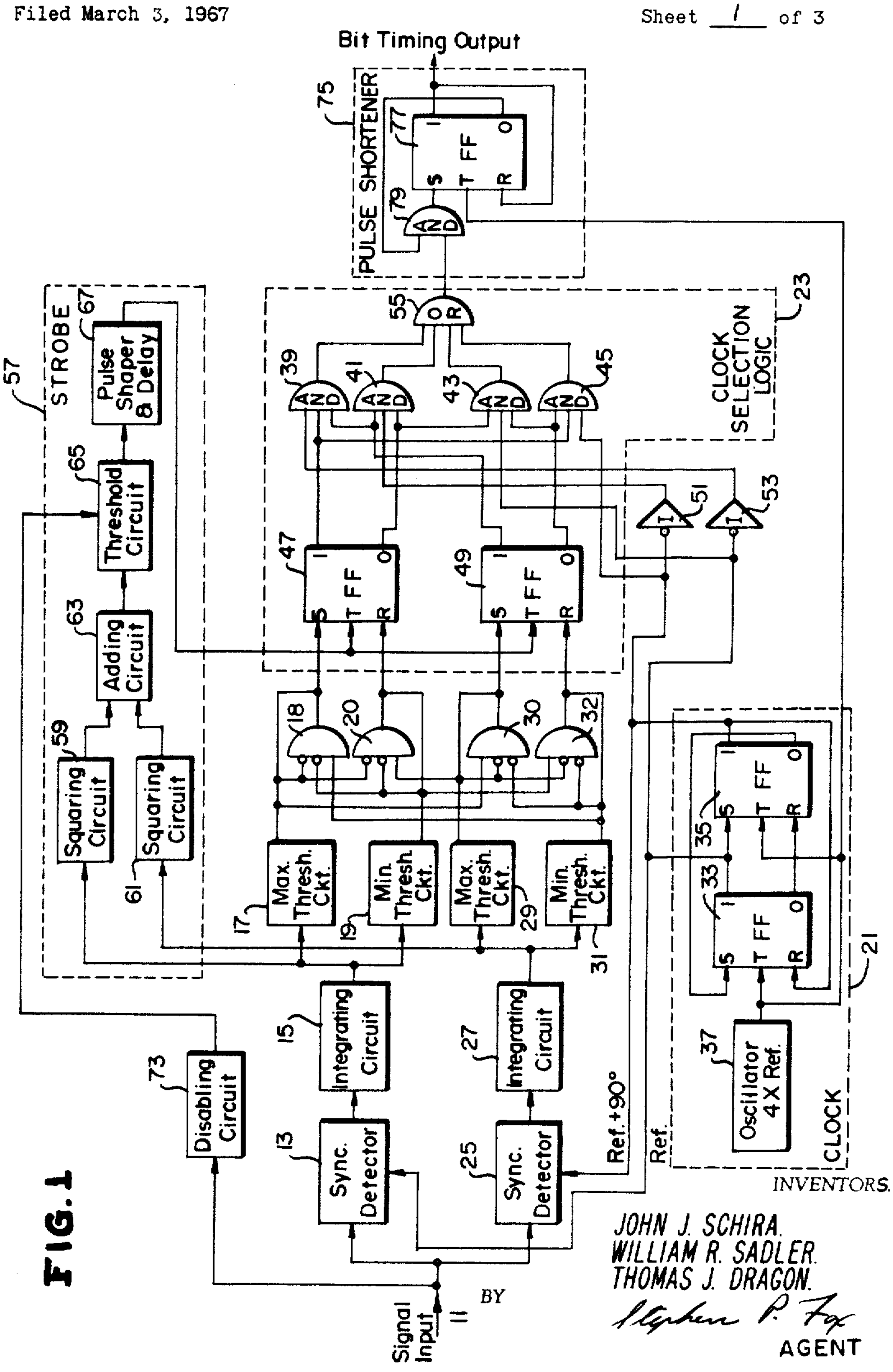
FIG. 1 is a combined schematic and block diagram of the preferred embodiment of the system of the present invention.

FIGS. 3 and 4*a–e* are illustrations of voltage waveforms which constitute the local reference signal generation in the system of FIG. 1.

Figure 5:
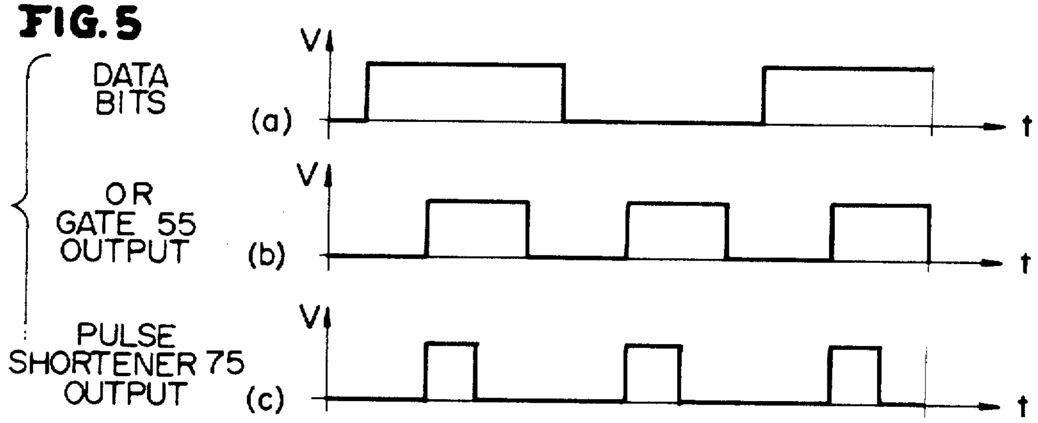

FIGS. 5*a–c* are waveform illustrations representing the relationship between received data bits and derived clock pulse timing.

Figure 6:
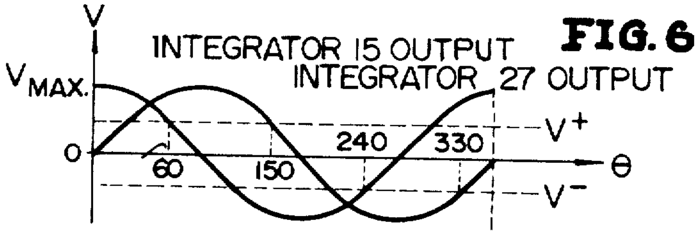

FIG. 6 is an illustration exemplifying the relationship between the integrator output voltages at the end of synchronization time and the phase differences between the input synchronizing preamble signal and the local reference signals.

FIG. 7 is a block diagram of a second embodiment of a strobe circuit utilizable in the system of FIG. 1.

FIG. 8 is a table showing the conditions of the integrators and clock selection logic of the system of FIG. 1 as a function of the phase difference between the random phase synchronizing signal and the local reference signal.

Referring now to FIG. 1 in detail, the received synchronization preamble, constituting the first part of an information frame, is applied through input lead 11 to first and second parallel circuit branches constituting the phase detector circuitry. The two circuit branches are identical in configuration and operation and differ only with respect to their reference inputs. One of the two branches comprises synchronous detector 13, integrating circuit 15, maximum threshold circuit 17, and minimum threshold circuit 19. Synchronous detector 13 is essentially a transmission gate which passes its input signal in synchronism with a reference or control signal from clock 21, hereinafter described, but reverses the phase of the input signal by 180° during alternate one-half cycles of the reference signal. Its output is a waveform which varies as the phase relationship between the reference signal and the synchronization preamble signal.

Synchronous detectors of the type described herein are well known in the prior art and are often used to detect the presence of a periodic signal in noise. By cross-correlating the input signal plus noise and an undistorted copy of the input signal, i.e., a local reference or control signal, the synchronous detector acts as a filter at the frequency of the input signal and serves to recover the desired signal from unwanted noise and other interference. An example of a circuit which may be adapted for use as a synchronous detector in the present system is shown and described in Patent No. 3,212,013, issued to D. A. Hillis on Oct. 12, 1965.

The output of synchronous detector 13 is connected to integrator 15, which may be a standard RC integrating circuit. Integrator 15 averages the synchronous detector output for a time period corresponding to the duration of the synchronization preamble input and produces a DC analog output voltage proportional to the shape of the synchronous detector output waveform. The integrator circuitry should be designed with a time constant sufficiently long enough to allow its output voltage level to gradually range between certain maximum and minimum values during the averaging period, as will be hereinafter described.

Throughout the present system, the use of positive logic is assumed. Therefore, in the following circuit description, a high level or positive voltage is equivalent to a binary 1, and a low level or zero voltage is equivalent to a binary 0.

Integrator 15 is connected to maximum and minimum threshold detecting circuits 17 and 19, respectively, which function to convert the integrator analog output voltage into digital signals for driving the clock selection logic 23. The maximum threshold detector 17 is set to produce a high level or positive voltage output when the DC output voltage from the integrator 15 exceeds a predetermined positive threshold value. Similarly, the minimum threshold detector 19 produces a high level output whenever its analog voltage input is more negative than a predetermined negative threshold value. The threshold voltages for the maximum and minimum threshold detectors are set at $V^+$ and $V^-$, respectively, and are a function of the integrating time and circuit parameters, as will be hereinafter described. One example of a circuit which may be adapted for use as a threshold detector in the present system is the conventional Schmitt trigger. Another circuit which may be used is an overdriven differential amplifier capable of switching to a low level or a high level output when its input exceeds or is less than a threshold bias level. Such a circuit is shown and described in Patent No. 3,214,700, issued to W. R. Hook, on Oct. 26, 1965.

The second circuit branch of the phase detector comprises synchronous detector 25, integrating circuit 27, maximum threshold circuit 29, and minimum threshold circuit 31. The configuration and operation of this circuit branch is identical to the first circuit branch described above. The only difference is with respect to the two reference or control signals for the two synchronous detectors 13 and 25. The reference signals both have the same frequency as the synchronization preamble, but the reference signal for synchronous detector 25 is delayed 90° in phase from the reference signal for synchronous detector 13.

The control or reference signals are produced by clock circuitry 21, which comprises two bistable multivibrators or flip-flops 33 and 35, and an oscillator 37. Each flip-flop has an "1" output, a complementary "0" output, a set input "S," a reset input "R," and a trigger input "T." The set and reset inputs are each internally AND gated with the trigger input, so that the set and reset inputs to the internal AND gates are rendered active only during application of a trigger input pulse. The "1" and "0" outputs of flip-flop 33 are respectively connected to the "S" and "R" inputs of flip-flop 35. Also, the "1" and "0" outputs of flip-flop 35 are respectively connected to the "R" and "S" inputs of flip-flop 33. The "T" inputs to both of these flip-flop are driven by a square wave oscillator 37, which operates at four times the frequency of the aforementioned control or reference signals.

The frequency and phase relationships for the clock circuitry 21 are shown in FIG. 3. The reference signal is produced at the "1" terminal of flip-flop 33, and the 90° delayed reference signal is produced at the "1" terminal of flip-flop 35. Since oscillator 37 operates at four times the frequency of the reference signal, there will be four trigger pulses produced during each cycle of the reference signal or reference signal delayed. Assuming both flip-flops to be initially in their "0" output states with low level output signals appearing at both "1" terminals, as shown in FIG. 3, flip-flop 33 will be prepared for set and flip-flop 35 will be prepared for reset. These respective inputs will become active upon application of the first trigger pulse, causing flip-flop 33 to change states, and flip-flop 35 to maintain its previous state. Now both flip-flops are prepared for set and upon application of the second trigger pulse, flip-flop 35 changes state, while flip-flop 33 maintains its previous state. The third and fourth trigger pulses cause operation of the circuitry in a manner similar to that just described. Thus, flip-flop 33 changes state on the first and third trigger pulses while flip-flop 35 changes state on the second and fourth trigger pulses. In continuous operation, the result is two square wave output signals shifted 90° from one another, and each having the same period, which is four times longer than the period of the oscillator 37.

Clock selection logic circuitry 23 comprises four three-input AND gates 39, 41, 43 and 45, and two flip-flops, 47 and 49. Each AND gate has two control inputs driven by the outputs from flip-flops 47 and 49. Flip-flop 47 has its "1" output terminal connected to one of the inputs for each of the AND gates 39 and 45, and has its complementary "0" output terminal connected to an input of each of the AND gates 41 and 43. Also, flip-flop 49 has its "1" terminal connected to one input of each of the AND gates 39 and 41, and has its "0" terminal coupled to an input of each of the AND gates 43 and 45. Each of the four AND gates also has an additional clock or reference signal input. Specifically, AND gate 39 has an input connected through a signal inverting amplifier 53 to the "1" output terminal of flip-flop 33, and AND gate 41 has an input connected through inverting amplifier 51 to the "1" terminal of flip-flop 35. Also, an input to AND gate 43 is coupled directly to the "1" output of flip-flop 33, and lastly, AND gate 45 has an input connected directly to the "1" output terminal of flip-flop 35. The outputs of the four AND gates are applied to a four-input OR gate 55.

With respect to flip-flop 47, its set (S) and reset (R) inputs are connected, respectively, to the outputs of maximum threshold circuit 17 and minimum threshold circuit 19. Similarly, the set and reset inputs of flip-flop 49 are connected, respectively, to the outputs of maximum threshold circuit 29 and minimum threshold circuit 31. Each flip-flop, 47 and 49, also has a trigger (T) input connected to the output of strobe circuitry 57, which will be hereinafter described.

Threshold circuits 17 and 19 are also connected to flip-flop 47 by two logic gates 18 and 20. Similarly, threshold circuits are connected to flip-flop 49 by two logic gates 30 and 32. The purpose of each pair of logic gates is to properly condition the flip-flop inputs when neither of their corresponding threshold circuits produces an output. This condition occurs when the voltage output from one or the other of the integrating circuits falls in an intermediate range between the threshold voltages $V^+$ and $V^-$, as will be more fully described hereinafter.

Each of the four logic gates 18, 20, 30 and 32 is an AND gate having three inputs, two of which invert the input signal. Thus, if the three input signals are logically designated A, B and C, the gate will produce an output when the inputs are present in the combination $\overline{AB}C$.

Each of the logic gates 18 and 20 has one of its inverting inputs connected to the output of threshold circuit 17 and the other of its inverting inputs connected to the output of threshold circuit 19. The non-inverting input of gate 18 is coupled to the output of minimum threshold circuit 31, and the non-inverting input of gate 20 is coupled to the output of maximum threshold circuit 29. The outputs of gates 18 and 20 are connected respectively to the set and reset inputs of flip-flop 47. Similarly, the two inverting inputs to each of the logic gates 30 and 32 are connected to the outputs of threshold circuits 29 and 31, respectively. Also, the non-inverting inputs to gates 30 and 32 are coupled respectively to the outputs of threshold circuits 17 and 19. The outputs of gates 30 and 32 are connected respectively to the set and reset inputs of flip-flop 49.

The four AND gates 39, 41, 43 and 45 function as transmission gates to selectively pass one of four possible clock signals corresponding to the reference signal, the delayed reference signal, and the inverted counterparts thereof. Only one of these AND gates is enabled for any given information frame being received. The particular AND gate selected is the one having both of its control inputs activated, as determined by the combination of outputs from flip-flops 47 and 49. The states assumed by these two flip-flops are dependent on the conditions of their inputs, which are driven by the above-described maximum and minimum threshold circuits and associated logic gates. The two bistable flip-flops 47 and 49 operate to place the clock selection logic in a memory-hold configuration, thereby maintaining one of the four AND gates in a selected condition for the duration of a received information frame. A new memory-hold period is initiated at the beginning of each frame by strobing the trigger inputs to the flip-flops 47 and 49.

Strobe circuitry 57 comprises squaring circuits 59 and 61 having inputs connected respectively to the outputs of integrating circuits 15 and 27. The outputs of the squaring circuits are connected to the inputs of an adding circuit 63, the output of which is coupled to a threshold circuit 65. The output of this threshold circuit is connected to a pulse shaper and delay circuit 67, which drives the trigger inputs of flip-flops 47 and 49. In operation, the analog voltage outputs from the two integrators are respectively squared by the two squaring circuits and added by the adding circuit. The purpose of the squaring circuits is to obtain a unipolar output. The output of the integrating circuits are either positive or negative, depending upon the phase relationship between the incoming signal and the reference signals. During reception of the synchronization preamble, the adding circuit produces a unipolar analog voltage output which gradually increases in magnitude and is substantially independent of the phase of the incoming preamble signal. The threshold circuit 65 is set to produce a high level output when its analog voltage input exceeds a predetermined magnitude which is reached after a given number of cycles of the synchronization preamble have been received. This threshold circuit output signal activates the pulse shaper and delay circuit, which shortly thereafter, emits a strobe pulse. The short delay permits the outputs of the maximum and minimum threshold circuits to be properly conditioned before the strobe pulse is emitted. The pulse shaper and delay circuit preferably includes additional circuitry to clamp to ground any superfluous signals on its input terminal while it is in an inactive state.

There is provided a disabling circuit 73 having an input connected to the input signal lead 11, and an output connected to a control input of threshold circuit 65. The disabling circuit monitors the incoming signal and produces a DC output voltage proportional to the peak-to-peak value of the input signal. The output voltage provides a variable bias for the threshold circuit 65, thereby controlling its threshold voltage. When high level noise is present on the input lead 11, an increased bias voltage from disabling circuit 73 shifts the threshold level of circuit 65 above the maximum voltage output of adding circuit 63. Thus, the circuit 73 effectively desensitizes the strobe circuit and prevents the generation of a strobe signal when a noise burst is received.

The strobe circuitry 57 of FIG. 1 represents an analog method of obtaining a strobe output pulse. An alternative embodiment utilizing digital methods for producing a strobe pulse is shown in FIG. 7. This embodiment includes a counter 69 and a one-shot delay multivibrator 71. The counter has an input driven by the preamble signal on lead 11, and an output which is applied to the trigger inputs of flip-flops 47 and 49, shown in FIG. 1. The one-shot delay multivibrator has an input connected to the signal lead 11, and an output coupled to a reset input of the counter. The counter emits a strobe pulse after a predetermined number of cycles of the synchronization preamble have been received. The one-shot delay multivibrator circuit parameters are such that an output pulse is produced whenever there is a gap or break in continuity in the input signal. With this arrangement, the counter is repeatedly reset before a strobe pulse is emitted, except when a continuous, good quality synchronization preamble signal is received.

Pulse shortener 75 (FIG. 1) comprises a flip-flop 77 and a two-input AND gate 79. One of the inputs to this AND gate is connected to the output of OR gate 55. The other AND gate input is coupled to the "0" output of the flip-flop 77. This flip-flop has its trigger input connected to the output of oscillator 37, and its set input connected to the output of AND gate 79. The "1" output of the flip-flop is fed back to its own reset input, and is the terminal from which the bit timing is derived. Assuming that flip-flop 77 is initially in its "0" output state, AND gate 79 will be enabled during one of the four 90° phase intervals of the reference signal period, depending on the particular clock signal selected by one of the four AND gates 39, 41, 43 and 45. The flip-flop 77 will then be prepared for set and will shift to its "1" output state upon application of a trigger pulse from oscillator 37. In its "1" state, the flip-flop is prepared for reset, so the next succeeding trigger pulse will return the flip-flop to its "0" state. Thus, the duration of each clock pulse will be shortened to the period of the trigger signal, which is one-fourth that of the reference signal.

It will become apparent from the ensuing description of the system operation that the purpose of the pulse shortening circuit is to reduce the time duration of each clock pulse of the bit timing signal to about 25% of the time duration of a data bit. The circuit 75 illustrated in FIG. 1 is the preferred embodiment for accomplishing this purpose; however, other circuits may be utilized. For example, the pulse shortening means may comprise a monostable multivibrator triggered by the leading edge of a clock pulse output from OR gate 55 and being operable to produce an output pulse having the required predetermined time duration.

*Operation*

The overall operation of this system may be best understood by considering first a typical received information signal. As stated previously, the signal comprises a succession of information frames. FIG. 2 shows a portion of one such frame, which begins with a predetermined number of cycles of a sine wave synchronization preamble and ends with a series of data bits forming a message. Between the synchronization preamble and the data bits, there is preferably a guard interval, void of intelligence, to allow time for the system to cycle and select the proper bit timing for the following data bits. Each cycle of the synchronization preamble has a period T which is preferably the same as the time duration of a data bit, thus the synchronization preamble frequency and the data bit rate are the same. The duration of the guard interval is *n*T, i.e. an integer multiple of the period T. As illustrated, interfering noise may precede the first transmitted information frame or occur between successive information frames.

The present invention is responsive only to the synchronization preamble portion of the information frame fed to the input lead 11. The synchronized bit timing produced by the system is used to drive additional utilization and processing circuitry (not shown) which functions to abstract intelligible information from the message data bits. This additional circuitry would also include means for rendering the present synchronization system inoperative during reception of the data bits.

Figure 4:
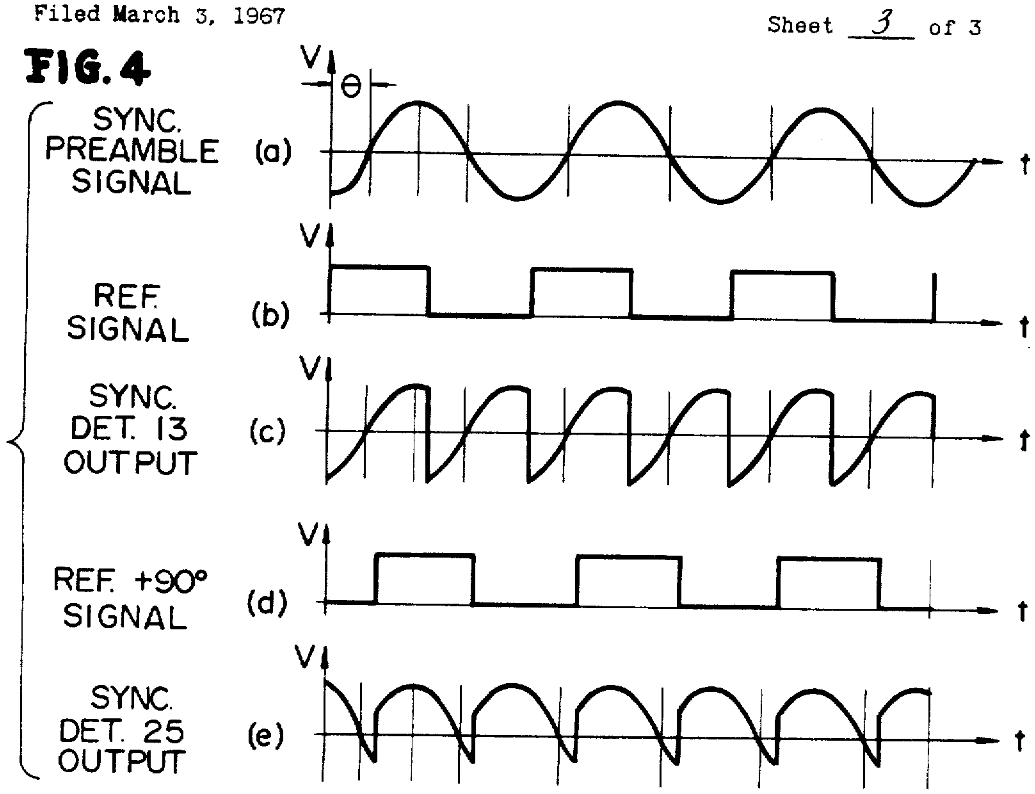

Referring now to FIGS. 1, 4*a* and 4*b*, the synchronization preamble is applied in parallel to both synchronous detectors 13 and 25 at some random-phase angle $\theta$, defined as the angle from the positive going edge of the reference signal to the beginning of the positive going half-cycle of the preamble signal. Comparing FIGS. 4*a*, 4*b* and 4*c*, it can be seen that during the first half-cycle of the reference signal, synchronous detector 13 transmits the preamble signal in unchanged form, whereas during the second half-cycle of the reference signal, the preamble signal is transmitted in inverted form. The resulting output waveform is shown in FIG. 4*c*. Similarly, by comparing FIGS. 4*a*, 4*d* and 4*e*, it can be seen that during the first half-cycle of the 90° delayed reference signal, synchronous detector 25 transmits the preamble signal in unchanged form, whereas during the second half-cycle of the delayed reference signal, the inverted form of the preamble signal is transmitted.

Integrating circuits 15 and 27 average the waveforms shown in FIGS. 4*c* and 4*e*, respectively, for a predetermined time interval corresponding to the duration of the synchronization preamble. For long averaging times, the noise portion of the input signal will tend to approach a mean value of zero, thus increasing the signal-to-noise ratio. For a finite observation period, corresponding to a given number of cycles of the synchronization preamble, the signal-to-noise ratio at the integrator output, $(S/N)_{out}$, can be expressed by the following relationship:

$$(S/N)_{out}=2WP(S/N)_{in}$$

where $(S/N)_{in}$ is the peak signal-to-R.M.S. noise ratio at the integrator input, W is the noise band-width, and P is the observation period.

During the averaging period, the two integrators produce analog voltage outputs which gradually approach certain predetermined levels. The integrator output voltage levels at the end of the averaging period are functions of the phase angle difference $\theta$, and as illustrated in FIG. 6, for the case of a sine wave synchronization preamble, the two integrator outputs are sinusoidal functions of $\theta$. Specifically, the output of integrator 15 is $V_{max} \cos \theta$, and the output of integrator 27 is $V_{max} \sin \theta$, where the amplitude voltage $V_{max}$ is dependent on the particular circuit parameters.

As hereinabove described, the maximum and minimum threshold circuits convert the integrator analog output voltages into digital signals for driving the clock selection logic. The threshold voltages $V^+$ and $V^-$ are chosen as $|V_{max/2}|$ respectively above and below the zero voltage level, as shown in FIG. 6. The two maximum threshold circuits 17 and 29 have their threshold values set at $V^+$. Thus, these two threshold circuits will condition the set inputs of their associated flip-flops 47 and 49, respectively, whenever the phase angle $\theta$ is such to cause the integrator output voltage levels to exceed the voltage $V^+$ at the end of the averaging period. Similarly, the two minimum threshold circuits 19 and 31 will condition the reset inputs of their associated flip-flops, whenever the integrator outputs are below the voltage $V^-$ at the end of the averaging period. As noted previously, the conditioning signals on the set and reset inputs of these two flip-flops serve to prepare them for their next stable state, and the actual switching of the flip-flops is achieved by strobing their trigger inputs.

As illustrated in FIG. 6, there are certain ranges of the phase angle $\theta$ for which one or the other of the integrator outputs will be at a voltage in between the threshold voltages $V^+$ and $V^-$. When this condition exists, neither of the corresponding maximum and minimum threshold circuits will produce an output. Thus, one of the flip-flops 47 or 49 would have neither its set nor reset inputs operated, and the state of the flip-flop would be indeterminate. This situation is avoided by employing the two pairs of logic gates 18, 20 and 30, 32. For example, when neither the maximum nor minimum threshold circuits 17, 19 produces an output, the pair of logic gates 18, 20 connected thereto will condition either the set or reset input to the flip-flop 47. The particular flip-flop input conditioned depends on the outputs from the threshold circuits 29, 31. Thus when one integrator produces an intermediate output voltage between $V^+$ and $V^-$, the other integrator controls both of the flip-flops 47 and 49.

At the end of the synchronization preamble the strobe circuitry 57 emits an output pulse to trigger the flip-flops 47 and 49, which assume states dependent on the phase angle $\theta$ between the preamble signal and the reference signal. The four binary outputs from these two flip-flops may exist in any of four possible combinations corresponding to values of $\theta$ in each of the four 90° phase intervals. Each combination selects a different one of the four AND gates 39, 41, 43 or 45, to permit transmission therethrough of their associated clock signals, which may be the reference signal, the delayed reference signal, or the inverted counterparts thereof. The particular clock pulse selected is fed through OR gate 55 and is shortened in time duration by pulse shortener 75 and is thereafter used as the bit timing output. The clock selection logic 23 insures that the leading edge of a clock pulse always occurs near the center of a data bit. The purpose of the pulse shortener 75 is to ensure that the trailing edge of the clock pulse occurs well within the data bit time so as to prevent sampling of a data bit near the end thereof or while it is in a condition of transition. For example, if a data bit is 200 microseconds long and the threshold voltages are set as shown in FIG. 6, the bit timing pulses will each be 50 microseconds long, and will occur within approximately ±67 microseconds of the center of each data bit.

The table of FIG. 8 illustrates various circuit voltages and conditions for the four 90° phase intervals into which the phase angle difference $\theta$ may fall. With the threshold voltage levels set at $V^+$ and $V^-$, as previously described, these four 90° phase intervals are as shown in the left hand column of the table, and in FIG. 6. For any given 90° phase interval, one of the integrators 15, 27 will produce an output voltage above $V^+$ or below $V^-$, designated in the table as $>V^+$ or $<V^-$, respectively. Simultaneously in the same 90° phase interval, the other integrator output will be $>V^+$ or $<V^-$ for phase angles in one part of the interval, and will be an intermediate value between $V^+$ or $V^-$ for phase angles in another part of the same interval. The latter situation in which the integrator output voltage crosses the threshold level within the 90° phase interval is designated in the table by a dash (—). The table may be best explained with reference to several specific examples. Considering the hypothetical phase angle $\theta$ slightly less than 60° shown in FIG. 4*a*, the outputs from integrators 15 and 27 will both be greater than the $V^+$ threshold voltage ($>V^+$). This will cause the maximum threshold circuits 17 and 29 to activate the set inputs of flip-flops 47 and 49, which after being strobed, will be in their "1" output stable states. These conditions will enable AND gate 39, thus permitting transmission of the inverted reference signal, designated as $(\text{REF.})_I$. FIG. 5*a* illustrates the subsequently received data bits having the proper phase relation and duration with respect to the synchronization preamble of FIG. 4*a*. For the example being discussed, FIG. 5*b* shows the inverted form of the reference signal of the FIG. 4*b* selected as the appropriate clock pulse and transmitted to OR gate 55. The derived bit timing is the shortened form of this inverted reference signal, as shown in FIG. 5*c*, and is used by additional processing circuitry (not shown) to sample the data bits near the center thereof.

Considering now another example in the same 90° phase interval, if the hypothetical phase angle $\theta$ were close to 0°, the output of integrator 15 will be $>V^+$, so maximum threshold circuit 17 will activate the set input of flip-flop 47, as described above. However, the output of integrator 27 will be in between $V^+$ and $V^-$, so neither maximum nor minimum threshold circuits 29, 31 will produce an output. In this case, logic gate 30 will activate the set input of flip-flop 49. Therefore, the clock selected will be the same as in the previous example of a 60° phase angle.

For values of $\theta$ in the remaining three 90° phase intervals, the operation of the overall system is substantially the same as that described above. Thus, at the end of the synchronization preamble, the particular bit timing selected corresponds to the inverted 90°-delayed reference signal, the reference signal, or the 90°-delayed reference signal. In the table of FIG. 8, these signals are respectively designated $(\text{REF.}+90°)_I$, REF., and REF.+90°.

As stated previously, the present embodiment of applicants' invention utilizes threshold voltages $V^+$ and $V^-$ having a magnitude $|V_{max.}/2|$. It is to be noted that different threshold voltages may be chosen with an attendant displacement in the 90° phase intervals. For example, if the threshold levels $V^+$ and $V^-$ were set very close to 0 volts, there will be substantially no phase angle $\theta$ for which the integrator output voltages are between $V^+$ and $V^-$. Therefore, the two pairs of logic gates 18, 20 and 30, 32 could be eliminated. However, it has been found that overall circuit operation is more satisfactory when clock selection is based on high level integrator output voltages, as provided by the threshold circuits being set at $|V_{max.}/2|$.

Throughout the present discussion, it has been assumed that the synchronization preamble is a sine wave signal. It is apparent that the preamble signal may be a repetitive pattern having a different waveform, such as a square wave signal. Of course, there would be attendant changes in the waveforms and voltage level outputs throughout the system, but these changes would in no way affect the overall principle of operation of the system. For example, the synchronous detector outputs shown in FIGS. 4*c* and 4*e* might, instead, be square wave signals, and the integrator outputs as functions of the phase angle difference $\theta$ might be linear relationships instead of the sinusoidal relationships shown in FIG. 6.

With reference to FIG. 2, the length of an information frame, the length of the synchronization preamble, and the speed of operation will be dependent on particular circuit parameters, overall equipment stability, and common expedients known in the art. It has been found in practical use that satisfactory system operation is achieved with a 14 millisecond information frame comprising a 1.6 millisecond synchronization preamble, a .8 millisecond guard interval, and an 11.6 millisecond data bit message. Each data bit and each cycle of the synchronization preamble is made 200 microseconds long, which permits eight cycles of the synchronization preamble and 58 data bits per information frame. Accordingly, each half-cycle of the reference signal and the delayed reference signal will be 100 microseconds long, and the shortened clock pulses comprising the derived bit timing are each 50 microseconds long.

While the synchronizing system has been shown and described in considerable detail and several variations in the system have been pointed out in the discussion herein, it will be understood that many other changes and variations may be made without departing from the spirit and scope of the invention.

What is claimed is:

1. A synchronizing system responsive to a received random-phase repetitive waveform synchronization preamble signal to produce data bit timing for a digital message signal following said preamble signal in an information frame, said system comprising
- means for generating four bit timing pulse signals separated by 90° intervals within the period of a data bit, said four signals corresponding to first and second reference signals and the respective inverted counterparts thereof, said first and second reference signals being shifted 90° in phase relative to one another, and each having a predetermined frequency the same as the bit rate of said digital information signal,
- means for detecting the phase angle between said random phase synchronization preamble and said first and said second reference signals, respectively, said phase detector means having a plurality of digital outputs for logically representing said phase differences in 90° intervals, and
- clock selection logic circuitry responsive to said digital outputs for selecting and holding one of said four bit timing pulse signals for sampling said data bits.

2. The synchronizing system according to claim 1 wherein said phase detector means includes
- first and second means for transmitting said random phase preamble signal in synchronism with said first and second local reference signals, respectively, and for inverting said preamble signal during respective alternate one-half cycles of said first and second reference signals,
- first and second analog output means for respectively integrating said first and second synchronously transmitted and periodically inverted preamble signals for a predetermined time duration thereof, and
- threshold circuit and logic gate means having binary outputs for indicating in combination any of four possible conditions corresponding to each of said first and second integrator analog outputs being greater than or less than predetermined reference values,
- and said clock selection logic circuitry includes
  - means for holding in memory the binary outputs from said threshold circuit and logic gate means, and
  - four AND gates, each having two control inputs coupled to said memory means, and also having a third input coupled to one of said four bit timing pulse signals, said two control inputs being operative to enable their corresponding AND gate in response to a predetermined one of said four binary output combinations held in memory from said threshold circuit means.

3. The synchronizing system in accordance with claim 1, said phase detecting means including
- first and second synchronizing preamble detectors respectively controlled by said first and second reference signals, each of said synchronizing detectors being operable to produce an output having a waveform dependent on the phase angle difference between its corresponding control signal and said synchronizing preamble,
- first and second integrators for producing analog outputs proportional to said first and second synchronous detector output waveforms, respectively,
- first and second pairs of threshold circuits coupled respectively to said first and second integrators, one threshold circuit of each pair having a digital output for indicating when said integrator analog output is greater than a predetermined upper reference value, and the other threshold circuit of each pair having a digital output for indicating when said integrator analog output is less than a predetermined lower reference value, and
- said clock selection logic circuitry including
  - first and second bistable multivibrators driven by said first and second pairs of threshold circuits, respectively, each of said multivibrators having a pair of complementary binary outputs,
  - four three-input AND gates, each having one of said inputs connected to a different one of said four bit timing signals, and having the other two of said inputs connected in a predetermined one of four combinations to said two pairs of complementary binary outputs, and
  - an OR gate for combining the outputs of said four AND gates.

4. The synchronizing system in accordance with claim 3, said phase detecting means further including logic gate means driven by said first and second pairs of threshold circuits for controlling both of said bistable multivibrators in response to the outputs from one of said pairs of threshold circuits when the other of said pairs of threshold circuits indicates that the output from the integrator corresponding to said other pair is in between said predetermined upper and lower reference values.

5. The system as claimed in claim 3 further including means coupled to said OR gate output for shortening each pulse of the selected bit timing signal to a pulse length less than 50% of the pulse length of a data bit.

6. The system of claim 5, said pulse shortening means comprising
- a bistable multivibrator having set, reset, and trigger inputs and a pair of complementary binary outputs, said trigger input being driven at four times the frequency of said reference signals, and
- a two-input AND gate having its output coupled to said set input and one input coupled to said OR gate, said complementary outputs being connected respectively to said reset input and to the other input of said AND gate.

7. The system as claimed in claim 2 further including strobe circuitry means for triggering said phase decision logic circuitry into a memory-hold configuration near the end of said synchronization preamble signal.

8. The system as defined in claim 3 additionally having circuitry for strobing said clock selection logic circuitry into a new memory-hold configuration near the end of said synchronization preamble signal, said strobe circuitry comprising
- first and second squaring circuits coupled respectively to the outputs of said first and second integrators,
- adding circuitry for combining the outputs of said squaring circuits, and
- threshold circuit means for generating a strobe pulse in response to a predetermined value of the output of said adding circuit, said strobe pulse being operative to simultaneously trigger both of said bistable multivibrators.

9. The system as defined in claim 3 additionally having circuitry for strobing said clock selection logic into a new memory-hold configuration near the end of said synchronization preamble signal, said strobe circuitry comprising resettable means for counting the cycles of said synchronization preamble signal and for generating a strobe pulse in response to a predetermined number of said cycles, said strobe pulse being operative to simultaneously trigger both of said bistable multivibrators, and monostable delay multivibrator means responsive to predetermined signal discontinuities in said synchronization preamble signal for resetting said counter before generation of a strobe pulse.

10. The synchronizing system in accordance with claim 7 further including means for monitoring said synchronization preamble signal and for disabling said strobe circuitry when a noise burst is received.

11. The combination in a receiver data bit timing system for a digital information processor comprising means for producing four data bit timing signals phase displaced at 90° intervals within the period of a data bit, and means responsive to a random phase repetitive waveform synchronization preamble signal preceding the data bits of a message in an information frame for correlating said preamble signal and said bit timing signals and for selecting one of said four bit timing signals to sample said message data bits near the centers thereof.

12. The combination of claim 11, said bit timing signal means comprising local clock circuitry for generating first and second clock pulse signals shifted 90° in phase relative to one another and each having the same period as one of said data bits, and means for respectively inverting said first and second clock pulse signals, said correlating and selecting means comprising first and second circuit branches being controlled by said first and second clock pulse signals, respectively, each of said branches including synchronous detector means responsive to said synchronization preamble signal to produce an output waveform having a configuration dependent on the phase difference between said synchronization preamble signal and one or the other of said first and second clock pulse control signals, means for integrating said synchronous detector output, and an analog-to-digital converter coupled to the output of said integrating means and having two digital output states corresponding respectively to analog input values above or below predetermined values, said analog-to-digital converter being selectively operable to hold its output in memory, and logic gate circuitry driven by said first and second circuit branches to select one of said four bit timing signals for sampling said data bits near the centers thereof.

13. The combination of claim 12, said clock circuitry including first and second flip-flops, each having set, re-set and trigger inputs and a pair of complementary binary outputs, said first flip-flop having its complementary outputs connected to the set and re-set inputs of said second flip-flop, said second flip-flop having its complementary outputs connected to the set and re-set inputs of said first flip-flop, and oscillator means for simultaneously driving the trigger inputs of both of said flip-flops.

14. A method for establishing data bit timing for a received information signal comprising the steps of full wave detecting a random phase repetitive waveform preamble portion of said information signal with respect to each of predetermined ones of a plurality of locally generated reference signals, integrating each of the full wave detected signals over a predetermined time period to generate an analog signal, threshold detecting the integrated analog signals to produce digitalized outputs for quantizing the phase difference between said preamble signal and said reference signals into one of a plurality of phase intervals, and logically interpreting said digitalized outputs to select one of said reference signals for use as a local clock to sample the data bits of said information signal.

15. A synchronizing system responsive to a received random phase repetitive waveform synchronization preamble preceding the data bits of a message in an information frame, said system comprising means for generating a plurality of phase displaced data bit timing signals within the period of a data bit, means for determining the phase difference between said preamble signal and each of predetermined ones of said phase displaced bit timing signals, and logic circuit means responsive to said phase determining means for selecting one of said bit timing signals to sample each of said message data bits.

References Cited

UNITED STATES PATENTS

| | | | |
|---|---|---|---|
| 3,072,804 | 1/1963 | Aaronson | 307—88.5 |
| 3,209,265 | 9/1965 | Baker et al. | 328—109 XR |
| 3,363,183 | 1/1968 | Bowling et al. | 328—109 XR |

OTHER REFERENCES

IBM Technical Disclosure Bulletin, vol. 4, No. 5, October 1961, p. 18, J. D. Bagley, Clock Recovery or Rephaser Circuit.

PAUL J. HENON, *Primary Examiner.*

R. B. ZACHE, *Assistant Examiner.*

U.S. Cl. X.R.

328—109